July 8, 1930.  L. J. STEPHENSON ET AL  1,770,257

METER

Filed Oct. 14, 1922    2 Sheets-Sheet 1

Inventors
L. J. Stephenson
& E. F. Pierce

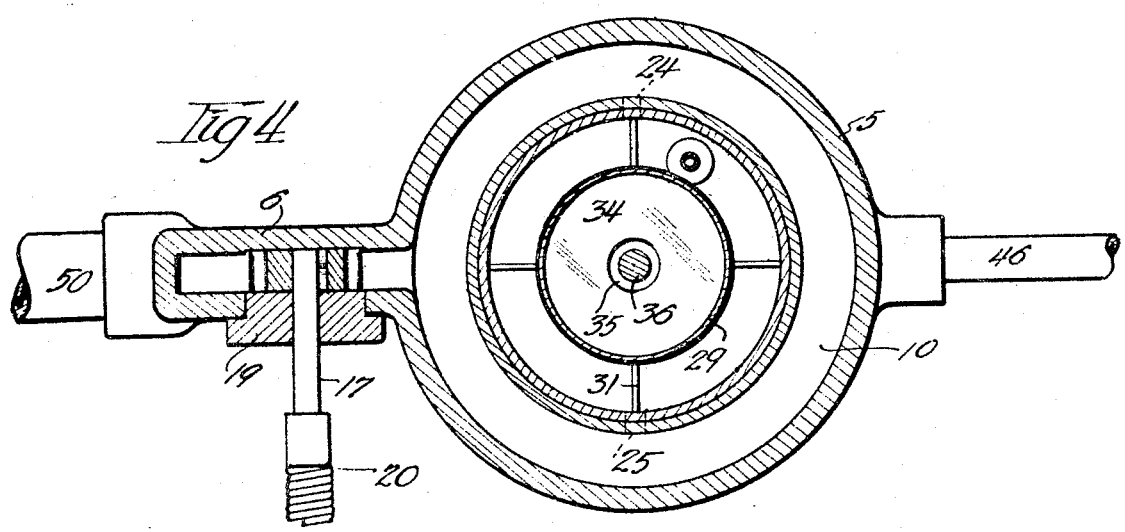
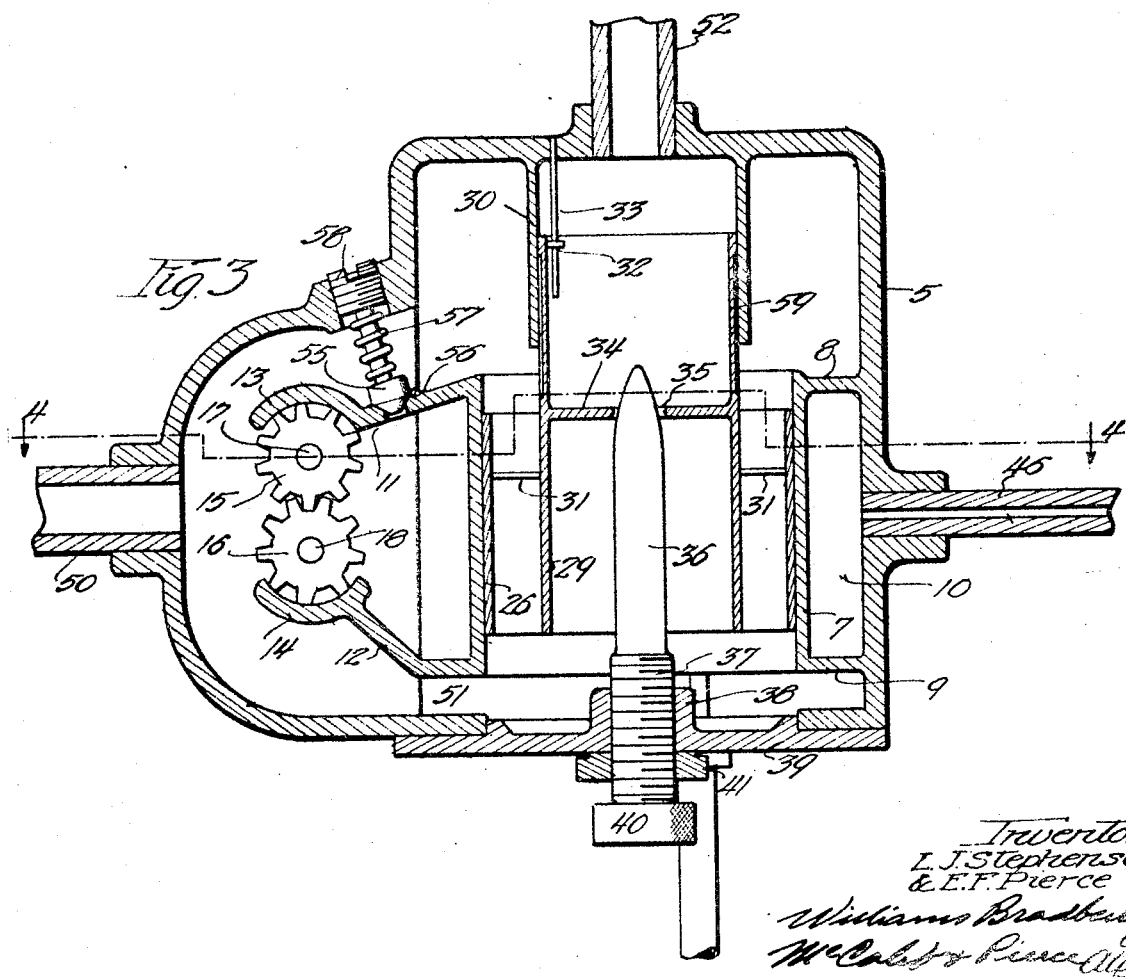

Patented July 8, 1930

1,770,257

UNITED STATES PATENT OFFICE

LEIGH J. STEPHENSON AND EARL F. PIERCE, OF CHICAGO, ILLINOIS; CENTRAL TRUST COMPANY OF ILLINOIS, ADMINISTRATOR OF SAID EARL F. PIERCE, DECEASED, ASSIGNOR TO FLORENCE E. PIERCE

METER

Application filed October 14, 1922. Serial No. 594,660.

Our invention relates to the generation of power and includes among its objects and advantages the instantaneous and accurate measurements and indication of the efficiency of such generation. More specifically, it involves the generation of a phenomenon having the mathematical characteristics of a quotient representing the input to an engine or power plant at some point before power generation occurs divided by the output at some point after the power has been generated and is being or has been transmitted to the point of application. It includes a method of combining input (or some related phenomenon) with output (or some related phenomenon), and a simple inexpensive durable and compact embodiment of apparatus for practicing the method.

Figure 3 is a view similar to Figure 4, but taken at right angles thereto, and

Figure 4 is a horizontal transverse section taken on the line 4—4 of Figure 3.

Throughout the several views, similar reference characters are used for referring to similar parts.

In the embodiment of apparatus selected for illustration of the invention we provide a pump adapted to produce a flow of fluid, the volume of which is constantly proportional to the speed of a mechanism or vehicle driven by the motor. The discharge from this pump passes through an orifice which is provided with a valve. The movement of this valve is controlled by a meter which measures the quantity of fuel passing to the motor of the mechanism in such manner that the area of the valve opening varies directly with the quantity of fuel being used by the motor. The opening and closing of the valve in response to variations in the quantity of fuel passing to the motor causes fluctuations in the pressure on the side of the discharge orifice next to the pump. As will afterwards be shown, the pressure of the fluid on this side of the orifice is an indication of the distance being traveled by the vehicle per unit of fuel consumed. This pressure is measured by a meter which may be calibrated directly in miles per gallon of fuel consumed or in any other suitable or desirable units.

In the particular embodiment of our invention, which we have illustrated in the accompanying drawings, our meter is adapted to indicate the number of miles traveled by a vehicle per gallon of fuel.

Figure 2:
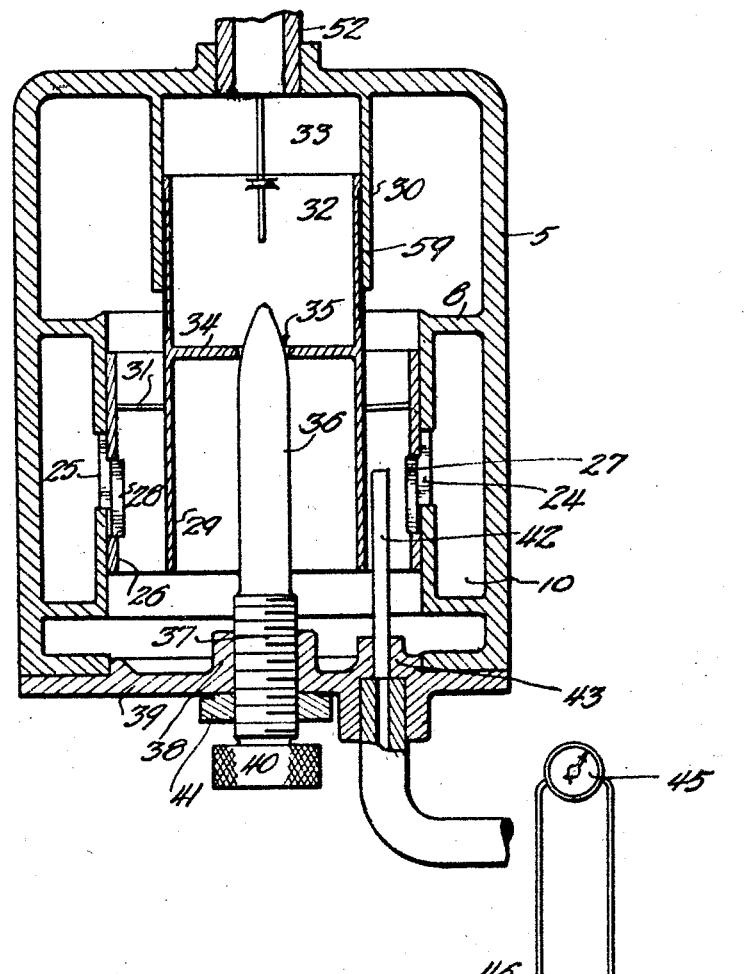
Figure 2 is a central, vertical section through a portion of our meter.

Referring for the present to Figures 2, 3 and 4, our meter comprises a fuel container 5, which is preferably more or less cylindrical in form, and has a vertically extending hollow boss 6 extending from one side thereof. Disposed substantially centrally of the container 5 is a cylindrical wall or partition 7, which, together with the two end walls 8 and 9, forms an annular chamber 10 which extends entirely around the inner wall of the container 5. This annular chamber opens into the hollow boss 6 at which point the partitions 11 and 12, extend into the hollow boss from the end walls 8 and 9 respectively and end in the circular portions 13 and 14 forming the side walls of a gear pump which includes the intermeshing gears 15 and 16 having the shafts 17 and 18 respectively, which are journaled in the cover plate 19, which is inserted in a suitable opening in one side of the hollow boss 6 and which may be held in place in any desired manner. The shaft 17 is extended outwardly from the cover plate 19, and has connected therewith one end of the flexible shaft 20, the opposite end of which is driven from a part of the vehicle which moves a distance proportional to the distance traveled by the vehicle. In this particular embodiment of our invention, we have shown this connection as comprising a worm gear 21, which is driven by a worm 22 secured to one of the front wheels 23.

The wall or partition 7 is provided with two diametrically disposed orifices or ports 24, and 25, respectively, which we have illustrated as being rectangular in form. A sleeve valve 26 is slidably mounted in the wall or partition 7, and is provided with ports 27 and 28, which preferably correspond in size and shape with the openings 24 and 25 respectively. The sleeve valve 26 is carried by a sleeve 29, the upper end of which is slidably mounted in the circular wall 30 projecting inwardly from the top of the container 5 by means of several rods 31. For preventing rotation of the ports 27 and 28 relatively to the ports 24 and 25 respectively, the sleeve 29 is provided with an inwardly extending lug 32, through which a pin 33 projects, this pin being mounted on the top of the container 5 and projecting inwardly therefrom substantially parallel with the direction of movement of the sleeve 29.

The pasageway through the sleeve 29 is partially restricted by a disk 34 which is formed integral therewith or otherwise secured thereto, and which is provided with a central openig 35 adapted to co-act with the upper curved end of the metering pin 36. The outer end of this metering pin is screw threaded as shown at 37, and extends through the internally threaded boss 38 projecting inwardly from the bottom cover plate 39. The outer end thereof is preferably provided with a knurled head 40 to facilitate its adjustment. If desired, a lock nut 41 may be provided for holding the metering pin in its adjusted positions.

A tube 42 has its lower end mounted in a hollow boss 43, projecting inwardly from the cover plate 39, and extends upwardly to a point about midway between the top and bottom of the port 24, but slightly to one side of this port. A pipe 44 connects with the hollow boss 43, and leads to an indicating pressure gauge 45, which is designed to differentiate two pressures, and indicate the difference between these pressures. Such gauges are well known, and need not be described in detail herein. The opposite side of the gauge is connected by the pipe 46 wkith a chamber 10, preferably at a point midway between the tops and bottoms of the ports 24 and 25, and midway between these two ports. From the above description, it will be clear that the gauge 45 will indicate the difference in pressure on opposite sides of the ports 24 and 25. The significance of this indication will be referred to later on.

Figure 1:
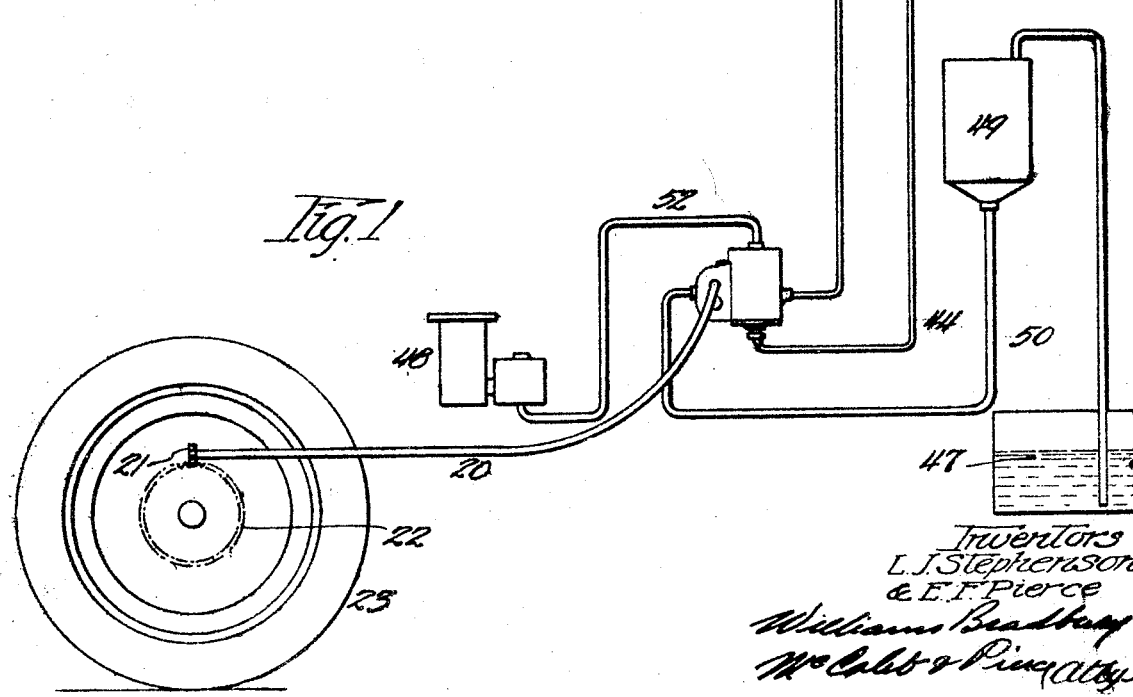
Figure 1 is a more or less schematic drawing, showing a vehicle equipped with our improved meter.

Referring now to Figure 1, wherein we have illustrated our meter applied to a vehicle, reference character 47 indicates a fuel supply tank which is located at a lower level than the carbureter 48, and a vacuum lift tank 49, which is of well known construction, and which is designed to lift the fuel from the supply tank 47 to a level higher than the carbureter 48. The fuel flows from the tank 49 through the pipe 50, and into the hollow boss 6, at a point adjacent the intake side of the gear pump formed by the two gears 15 and 16. From this point, the fuel is free to travel either through the gear pump or through the passageway 51, the sleeve 29, opening 35, circular wall 30, out through the pipe 52 to the carbureter 48. It will be noted that the container 5 is located at a level intermediate the levers of the carbureter 48, and the tank 49. It will, of course, be understood that while we have illustrated a main fuel supply tank 47, and a vacuum lift tank 49 for elevating the fuel from the tank 47, that our invention can be used just as well in a system in which the main fuel supply tank 47 is located at a level higher than the container 5, so as to do away with the necessity of the vacuum lift tank 49.

From the above description, it will be apparent that the metering pin 36 and the disk 34 form a flow meter in which the pressures on the opposite sides of the disk 34 are different by an amount equal to the weight of the disk 34 and the parts connected therewith, that is, the sleeve 29 and sleeve valve 26. This means that as the engine requires more fuel, the disk 34 will move upwardly to enlarge the openig 35, thus permitting a larger quantity of fuel to flow to the carbureter 48 and the engine associated therewith. We have so designed the curvature of the upper end of the metering pin 36, that the movement of the disk 34 and consequently of the sleeve valve 26 will be directly proportional to the quantity of fuel passing through the opening 35. The equation of the curvature of this pin is: $d = K(b^2 - r^2)$. Where $d$ equals the distance the disk 34 has moved from the position in which the opening therethrough is closed by the metering pin, K is a constant determined by the shake and size of the openig 35 and the canstant difference in pressures on the two sides of the disk 34; $b$ is the radius of the opening 35 and $r$ is the radius of the metering pin taken at the center of the openig 35.

The derivation of this equation is as follows: The discharge Q through an orifice is equal to $$K_1 \sqrt{P \times a}.$$

Where $K_1$ is a constant depending upon the shape of the orifice, P is a difference in pressures on the opposite sides of the orifice, and $a$ is the area of the orifice. In this particular case, the difference in pressures on the opposite sides of the oriflce 35 is constant, consequently $Q = K_2 a$ or $a = K_3 Q$. The area $a$ of the orifice $35 = \pi(b^2 - r^2) = K_3 Q$.

In order to have the lift $d$ proportional to the discharge, we assume that $K_4 d = K_3 Q = a$. Therefore, $K_4 d = (b^2 - r^2)$ or $$d = \frac{\pi}{K_4}(b^2 - r^2) = K(b^2 - r^2).$$

This is the equation of the curve of the inner end of the metering pin 36, and is a parabola such that the lift of the disk 34, and consequently of the sleeve valve 26 varies directly as the flow through the orifice 35.

Considering one of the ports 24 and 25, the discharge Q' from the pump $Q' = K_5 \sqrt{P a'}$.

Where $K_5$ is the constant depending upon the size and shape of the port, P equals the difference in pressures on opposite sides of the port, and $a'$ equals the area of the port, or $$\sqrt{P} = K_6 \times \frac{Q'}{a'}.$$

We have shown above that the lift or movement of the sleeve valve, and consequently the variation in the area of the ports 24 and 25, varies directly as the rate of fuel consumption or gallons per hour (G. P. H.), therefore, with the rectangular shaped orifice used $a' = K_7 \times G. P. H.$ The discharge of the gear pump is at the low pressures employed in this meter proportional to the speed, i. e., to miles per hour (M. P. H.) so that $Q' = K_8 \times M. P. H.$, therefore $$\sqrt{P} = K_6 \frac{Q'}{a'} = K_6 \times \frac{K_8 \times M. P. H.}{K_7 \times G. P. H.} = K_9 \frac{M. P. H.}{G. P. H.} = K \times M. P. G.$$

The last equation shows that $\sqrt{P}$ is directly proportional to the miles per gallon of fuel consumed. The gauge 45 indicates the pressure, but is to be calibrated directly in miles per gallon.

The relationships established above assume their rectangular shapes for the ports 24 and 25, and the shape of the pin 36 is calibrated accordingly. Other shapes of pin may be used, provided the orifices are also properly shaped to give the desired relationships.

When a vehicle provided with our meter is coasting, no fuel is being consumed, but the gear pump continues to operate to pump fuel into the annular chamber 10. To prevent the pressure in this chamber from increasing to a dangerous extent or degree, we provide a relief valve 55 which is held upon its seat 56 by means of a spring 57, which permits the valve 55 to open at a predetermined low pressure. The valve 55 and the spring 57 may, if desired, be held in place by a screw threaded plug 58.

There will be a certain slight amount of friction between the sleeve valve 26 and the wall 7, and between the sleeve 29 and the circular partition 30, but this amount of friction will be almost negligible because the pressures employed can be made very small, and there is, therefore, no necessity for a tight fit between the moving and the stationary parts referred to. For the purpose of making whatever friction there is between these elements constant, we prefer to cut away the sleeve 29 as shown at 59, so as to keep the area of contact between the sleeve 29 and the circular wall 30 constant. The travel of the sleeve valve 26 is insufficient to cause the ends thereof to extend beyond the circular partition 7, and the friction between these two elements will, therefore, remain constant.

While we have described the details of construction of a preferred embodiment of our invention it is to be clearly understood that our invention is not limited to these details, but is capable of other adaptations and modifications within the scope of the appended claims.

Having thus described our invention, what we claim is:

1. In a vehicle having an engine, a pump, said pump having a discharge orifice, and means for driving said pump at a speed constantly in proportion to the speed of said vehicle; a valve for regulating the size of said discharge orifice, means of supplying fuel to said engine comprising a conduit, a flow meter in said conduit comprising an element movable in direct proportion to the quantity of fuel passing through said conduit, means for causing said valve to move in direct proportion to the movement of said movable element, and means for measuring the difference in pressure between the opposite sides of said orifice.

2. In a meter comprising a pump having a discharge orifice; a flow meter comprising an element movable in direct proportion to the rate of flow through said flow meter, means controlled by said movable element for regulating the size of said discharge orifice, and means for measuring the difference in pressure upon opposite sides of said discharge orifice.

3. In a vehicle having an engine, a pump said pump having a discharge orifice, and means for driving said pump at a speed constantly proportional to the speed of said vehicle; means for supplying fuel to said engine comprising a conduit, a flow meter in said conduit comprising an element actuated by the flow of fuel through said conduit, a valve controlled by said actuated element for controlling the size of said pump discharge orifice, and means for measuring the difference in pressures between opposite sides of said orifice.

4. The method of indicating the efficiency of an engine which comprises generating a flow proportional to the output, directing said flow in a closed circuit, constricting the path of flow as a function of the fuel consumption, whereby the pressure difference created by constricting the path is a direct measure of the efficiency, and indicating the amount of such pressure.

5. The method of indicating the efficiency of an engine which comprises generating a flow proportional to the output, directing said flow in a closed circuit, constricting the path of flow as a function of the fuel consumption, whereby the pressure difference created by constricting the path is a direct measure of the efficiency, indicating the amount of such pressure, and utilizing the body of liquid fuel furnished to an engine in which to generate said flow.

6. In an efficiency meter having means for generating an indicatory flow of fluid proportional to the output; constricting means sensitive to the rate of fuel consumption for power purposes only for constricting the path of the indicatory flow, and a pressure indicator connected to show the pressure difference in said indicatory flow on opposite sides of said constricting means.

7. In an efficiency meter having means for generating an indicatory flow of fluid proportional to the output; constricting means sensitive to the rate of fuel consumption for power purposes only for constricting the path of the indicatory flow, and a pressure indicator connected to show the pressure difference in said indicatory flow on opposite sides of said constricting means, said indicatory flow being set up in a closed circuit in a body of liquid fuel from which the supply for power is taken.

In witness whereof, we hereunto subscribe our names, this 9th day of October, 1922.

LEIGH J. STEPHENSON.
EARL F. PIERCE.